United States Patent
Michino

Patent Number: 5,579,490
Date of Patent: Nov. 26, 1996

[54] EXPANDED ADDRESS BUS SYSTEM

[75] Inventor: Masami Michino, Tokyo, Japan

[73] Assignee: NEC Corporation, Tokyo, Japan

[21] Appl. No.: 462,665

[22] Filed: Jun. 5, 1995

Related U.S. Application Data

[62] Division of Ser. No. 377,683, Jan. 25, 1995, Pat. No. 5,450,522, which is a continuation of Ser. No. 62,331, May 17, 1993, abandoned, which is a continuation of Ser. No. 754,196, Aug. 28, 1991, abandoned, which is a continuation of Ser. No. 233,109, Aug. 17, 1988, abandoned.

[30] Foreign Application Priority Data

Aug. 17, 1987 [JP] Japan .................. 62-203106
Aug. 17, 1987 [JP] Japan .................. 62-203107

[51] Int. Cl.$^6$ ............................ G06F 13/00
[52] U.S. Cl. ............ 395/281; 395/886; 364/940.2; 364/927.93
[58] Field of Search .............. 473/70; 365/230.03; 395/281, 282, 283, 307, 421.02, 822, 823, 886

[56] References Cited

U.S. PATENT DOCUMENTS

| | | | |
|---|---|---|---|
| 4,545,010 | 10/1985 | Salas et al. ................... | 364/200 |
| 4,683,534 | 7/1987 | Tietjen et al. ................. | 395/307 |
| 4,691,282 | 9/1987 | Kinoshita ...................... | 364/200 |
| 4,754,435 | 6/1988 | Takamatsu ..................... | 365/230.03 |
| 4,887,813 | 12/1989 | Chiles, III et al. ............ | 473/70 |
| 5,038,317 | 8/1991 | Callan et al. .................. | 395/282 |
| 5,047,922 | 9/1991 | Borkar ......................... | 395/822 |
| 5,077,656 | 12/1991 | Waldron et al. ................ | 395/281 |

*Primary Examiner*—Jack B. Harvey
*Assistant Examiner*—Paul R. Myers
*Attorney, Agent, or Firm*—Sughrue, Mion, Zinn, Macpeak & Seas

[57] ABSTRACT

An expanded address bus system includes an address decoder for continuously assigning an address to a specific expanded address bus during an access, and access enable signal latch circuit for latching an output from the address decoder during the access, an address latch circuit for latching an address during an access of an address area decoded by the address decoder, an address latch control circuit for generating an address latch timing for the address latch circuit, and a plurality of selectors for selecting an output from the address enable signal latch circuit or the bus access enable signal on the address bus to supply the selected signal to a plurality of expanded slots.

5 Claims, 4 Drawing Sheets

EXPANDED ADDRESS BUS SYSTEM

This is a Division of application Ser. No. 08/377,683 filed Jan. 25, 1995, now U.S. Pat. No. 5,450,522, which is a Continuation of application Ser. No. 08/062,331 filed on May 17, 1993, now abandoned which is a Continuation of Ser. No. 07/754,196 filed Aug. 28, 1991, now abandoned which is a Continuation of Ser. No. 07/233,109 filed on Aug. 17, 1988, now abandoned.

BACKGROUND OF THE INVENTION

1. Field of the Invention

The present invention relates to an expanded address bus system and, more particularly, to an expanded address bus system wherein a bus access enable signal is included in address signals supplied to a plurality of expanding devices having various types of expanded address buses.

2. Discussion of Related Art

In a conventional expanded address bus system, an expanded address bus in which an address is kept asserted during an access and an expanded address bus in which the address is updated to an address for the next access during the current access are independently arranged in the system. Accordingly, the number of signal lines of the expanded address buses is undesirably increased.

In other conventional expanded address bus systems in which an expanded address bus has a predetermined address bit width and an expanding device's expanded address bus has a bit width smaller than the predetermined address bit width, i.e., a system having expanding devices with different address bit widths, separate command signal lines are arranged for the respective address bit buses having different address widths. Therefore, the number of signal lines of the expanded address bus system is increased, and the command signal lines, which greatly influence the operating speed for each system, must be provided in sets for address buses having different address bit widths. Therefore, the operating speed of the system is undesirably decreased.

SUMMARY OF THE INVENTION

It is an object of the present invention to eliminate conventional drawbacks described above and to provide an expanded address bus system which requires a smaller number of signal lines for an expanded address bus and does not adversely affect the operating speed of the system.

An expanded address bus system according to a first embodiment of the present invention comprises: an address decoder for continuously applying an address to a specific expanded address bus during an access; an access enable signal latch circuit for latching an output from the address decoder during the access; an address latch circuit for latching an address during an access of an address area decoded by the address decoder; an address latch control circuit for generating an address latch timing signal for the address latch circuit; and a plurality of selectors for selecting either an output from the access enable signal latch circuit or the bus access enable signal on the address bus to supply the selected signal to a plurality of slots.

The expanded address bus system according to a second embodiment of the present invention further comprises an address decoder for decoding part of an address space of an expanded address bus having a predetermined address bit width and applying a decoded result to an expanded bus having an address bit width smaller than that of the expanded address bus whose address space is partially decoded, and a selector for selecting either an output from the address decoder or the bus access enable signal on the address bus and supplying the selected signal to an expanded slot.

BRIEF DESCRIPTION OF THE DRAWINGS

The preferred embodiments are described with reference to the drawings in which.

DETAILED DESCRIPTION OF THE PREFERRED EMBODIMENTS

Preferred embodiments of the present invention will be described with reference to the accompanying drawings.

Figure 1:
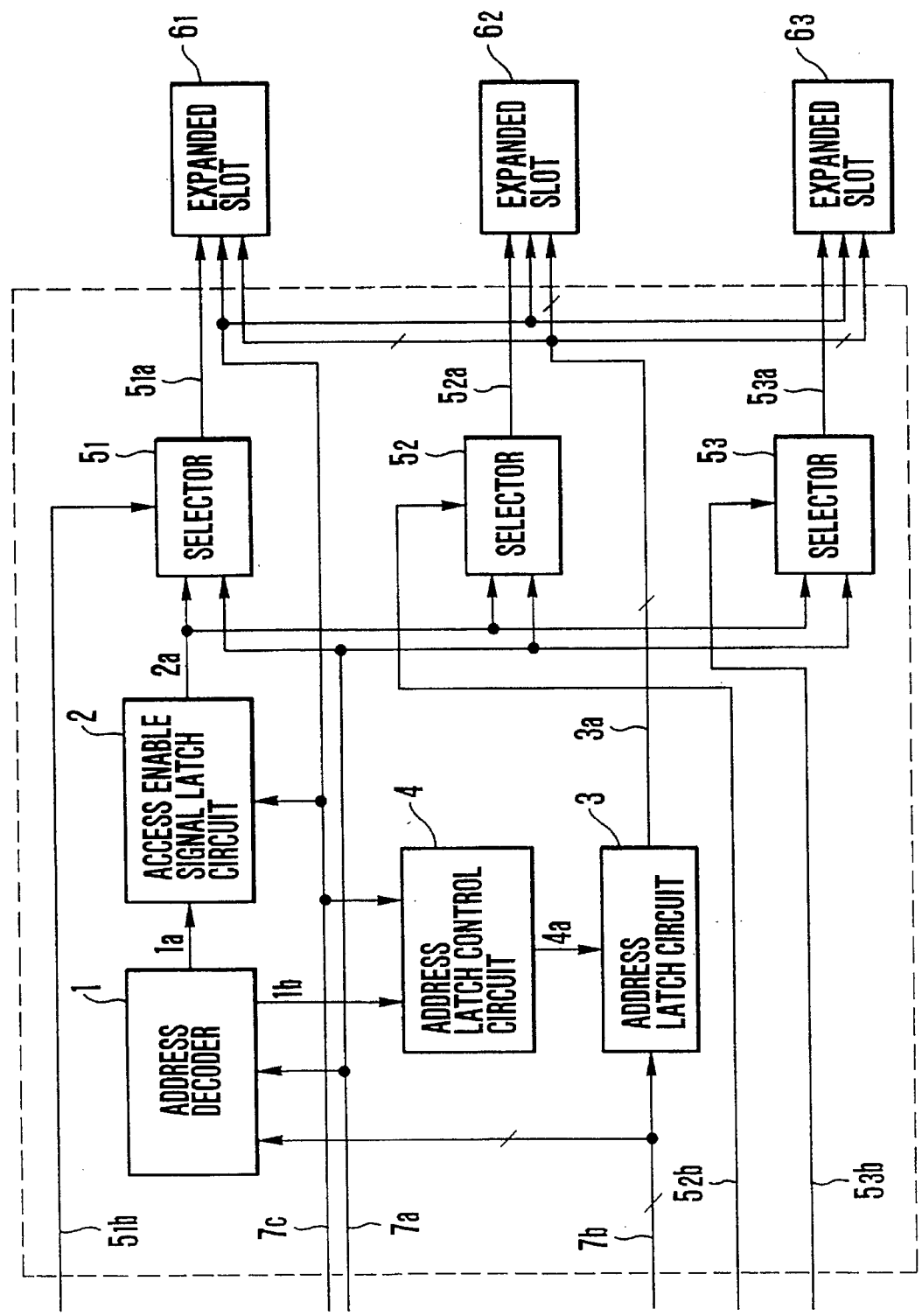
FIG. 1 is a block diagram showing an arrangement of an expanded address bus system according to an embodiment of the present invention.
Figure 2A:
FIGS. 2(a) to 2(j) are timing charts of the signals generated in the circuit of FIG. 1.
Figure 2B:
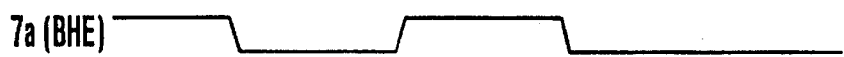
Figure 2C:
Figure 2D:
Figure 2E:
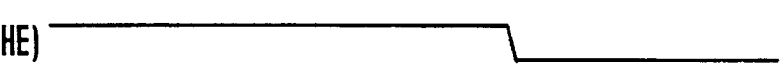
Figure 2F:
Figure 2G:
Figure 2H:
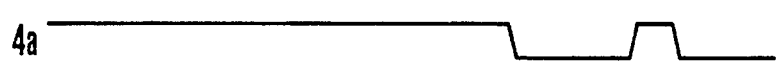
Figure 2I:
Figure 2J:
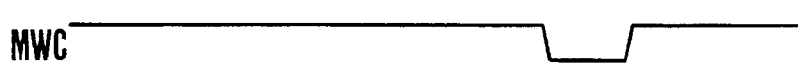

FIG. 1 is a block diagram showing an expanded address bus system according to an embodiment of the present invention.

Referring to FIG. 1, reference numeral 1 denotes an address decoder for continuously assigning a predetermined address area of a main memory (not shown) to an expanded address bus 3a in which the address is kept asserted during an address; 2, an access enable signal latch circuit for an output from the address decoder 1 during the access; 3, an address latch circuit for latching the address during an access of an address area decoded by the address decoder 1; 4, an address latch control circuit for generating an address latch timing signal for the address latch circuit 3; and $5_1$, $5_2$, and $5_3$, a plurality of selectors for selecting either the output from the access enable signal latch circuit 2 or a bus access enable signal on the address bus and supplying the selected signal to a plurality of expanded slots $6_1$, $6_2$, and $6_3$.

Reference numeral 7b denotes a 19-bit address bus; and 7a, bus access enable signal lines, i.e., a BHE signal line and a BLE signal line. BHE and BLE signals on the bus access enable signal line 7a are included in an address signal. When the BHE signal is active, the upper half of a data bus is enabled. When the BLE signal is active, the lower half of the data bus is enabled.

The addressing type for this system is one where the current address is updated to an address for the next access while the current address is being asserted. An expanded bus of this type is referred to as an expanded bus A. An expanded bus in which the address is kept asserted during an access is referred to as an expanded bus B.

The address decoder 1 assigns to the expanded bus B address area $C0000_H$ to $FFFFF_H$ (where H denotes the hexadecimal notation) of the address space ($00000_H$ to $FFFFF_H$) represented by the address bus 7b and the bus access enable signal lines 7a. The address decoder 1 assigns the remaining area to the expanded bus A. Reference numeral 1a denotes an area B decoded signal A output from the address decoder 1. The area B decoded signal A 1a consists of DBHE and DBLE signals. Reference numeral 1$b$ denotes an area B decoded signal B output from the address decoder 1. The DBHE signal of the area B decoded signal A 1$a$ is responsive to the BHE signal. The DBLE signal is responsive to the BLE signal. However, the area B decoded signal B 1$b$ is not responsive to the BHE signal or the BLE signal but is responsive to just the decoded address.

The access enable signal latch circuit 2 is a circuit for latching the area B decoded signal A 1$a$. Reference numeral 2$a$ denotes an area B enable signal output from the access enable signal latch circuit 2 and consists of BBHE and BBLE signals.

Each of the selectors $5_1$, $5_2$, and $5_3$ selects a signal output to an expanded slot connected thereto in accordance with the area B enable signal 2$a$ and the bus access enable signal 7$a$. Reference numerals $5_{1b}$, $5_{2b}$, and $5_{3b}$ denote bus type selection lines for signalling the type of expanded address bus (i.e., A or B) of the device connected to the corresponding expanded slots to control the selectors $5_1$, $5_2$, and $5_3$, respectively. Reference numerals $5_{1a}$, $5_{2a}$, and $5_{3a}$ denote access enable signal lines for signalling to the expanded slots $6_1$, $6_2$ and $6_3$ the signals selected by the selectors $5_1$, $5_2$, and $5_3$, respectively. Reference numeral 7$c$ denotes an address latch signal line for signalling a timing for latching the address signal on the address bus 7$b$.

The address latch control circuit 4 outputs an expanded address' latch signal 4$a$ representing a timing for causing the address latch circuit 3 to latch the address in accordance with the area B decoded signal B 1$b$ and a signal on the address latch signal line 7$c$. The address latch circuit 3 gates-an address signal of the address bus 7$b$ when the expanded address latch signal 4$a$ is set at "1". However, when the expanded address latch signal 4$a$ goes to "0", the address latch circuit 3 latches the address signal of the address bus 7$b$. Reference numeral 3$a$ denotes an expanded address bus for transmitting an output from the address latch circuit 3 to the expanded slots $6_1$, $6_2$, and $6_3$. Expanding devices (not shown) are connected to the expanded slots $6_1$, $6_2$, and $6_3$, respectively.

In the embodiment of FIG. 1, it is assumed that the data bus has 16 bits, upper eight bits and lower eight bits of which are enabled to be accessed in response to the BHE and BLE signals, respectively, and, an MRC (Memory Read Command) signal and an MWC (Memory Write Command) signal are supplied to the expanding devices through command lines.

When the expanded address signal supplied to the expanded slots $6_1$, $6_2$ and $6_3$ from the address latch circuit 3 through the expanded address bus 3$a$ represents an address area assigned to one of the expanding devices, the corresponding expanding devices operate as follows. In case that the MRC signal is received, it outputs or reads out data to the upper 8-bit portion of the data bus when the EBHE signal received through corresponding one of the access enable signal lines $5_{1a}$, $5_{2a}$, and $5_{3a}$ is active, and when the EBLE signal is active, it outputs data to the lower 8-bit portion of the data bus.

In case that the MWC signal is received, the expanding device inputs or writes the data of the upper 8-bit portion of the data bus when the EBHE signal is active, and inputs the data of the lower 8-bit portion of the data bus when the EBLE signal is active.

For example, when an expanded bus A type device is connected to the expanded slot $6_1$, the bus type selection line $5_{1b}$ is used on the expanded bus A side. In this case, the BHE and BLE signals of the bus access enable signal lines 7$a$ are selected as the EBHE and EBLE signals of the access enable signal line $5_{1a}$, so that all of the address areas from $00000_H$ to $FFFFF_H$ can be used.

When an expanded bus B type device is connected to the expanded slot $6_2$, the bus type selection line $5_{2b}$ is used on the expanded bus B side. In this case, the BBHE and BBLE signals of the area B enable signal 2$a$ are output as the EBHE and EBLE signals of the access enable signal line $5_{2a}$. Therefore, the EBHE signal is active when the BHE signal is active and the system accesses the address area from $C0000_H$ to $FFFFF_H$. The EBLE signal is active when the BLE signal is active and the system accesses the address area from $C0000_H$ to $FFFFF_H$. For this reason, the address space to be used by the expanded bus B type device is limited to the area from $C0000_H$ to $FFFFF_H$. When this area is accessed, the address output value of the expanded address bus 3$a$ is fixed by the address latch circuit 3 until the end of an access.

FIGS. 2($a$) to 2($j$) are timing charts for explaining an operation when the bus type selection lines $5_{1b}$, $5_{2b}$, and $5_{3b}$ are set on the expanded bus B side.

FIG. 2($a$) shows an address signal on the address bus 7$b$, FIG. 2($b$) shows the bus access enable signal (BHE), FIG. 2($c$) shows the bus access enable signal (BLE), FIG. 2($d$) shows a signal on the expanded address bus 3$a$, FIG. 2($e$) shows the EBHE signal on the access enable signal lines $5_{1a}$, $5_{2a}$, and $5_{3a}$, FIG. 2($f$) shows the EBLE signal on the access enable signal lines $5_{1a}$, $5_{2a}$, and $5_{3a}$ FIG. 2($g$) shows the address latch signal on the line 7$c$, FIG. 2($h$) shows the expanded address latch signal 4$a$, FIG. 2($i$) shows the MRC signal on the command bus, and FIG. 2($j$) shows the MWC signal on the command bus.

According to the present invention, as has been described above, an effect can be obtained wherein the expanded address bus, in which an address is kept asserted during an access, and the expanded address bus, in which an address is updated to an address for the next access during the current access, can be commonly used without increasing the number of signal lines of the expanded bus.

Figures 3, 4A, 4B, 4C, 4D, 4E, 4F, 4G:
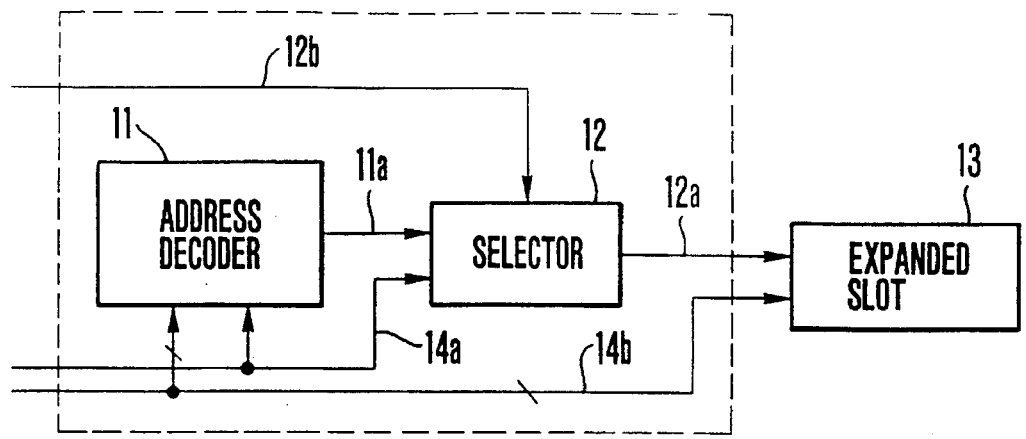
FIG. 3 is a block diagram showing an arrangement of an expanded address bus system according to another embodiment of the present invention.
FIGS. 4(a) to 4(g) are timing charts of the signals generated in the circuit in FIG. 3.

FIG. 3 is a block diagram of an expanded address bus system according to another embodiment of the present invention.

Referring to FIG. 3, reference numeral 11 denotes an address decoder for decoding part of an address space of an expanded address bus having a predetermined address width to assign the part of the address space to an expanded address bus having an address width smaller than the predetermined address width; and 12, a selector for selecting either an output from the address decoder 11 or a bus access enable signal and supplying the selected signal to an expanded slot 13.

Reference numeral 14$b$ denotes a 19-bit address bus. A line 14$a$ receives a bus access enable signal consisting of the BHE and BLE signals. The BHE and BLE signals are included in an address signal. When the BHE is active, the upper half of the data bus can be accessed and, when the BLE signal is active, the lower half of the data bus can be accessed.

The address decoder 11 is a circuit for assigning part of an address space from $00000_H$ to $FFFFF_H$ represented by the address bus 14$b$ and the bus access enable signal 14$a$ to a device having an address space smaller than that. The address bus of the device having a smaller address space is given as a 15-bit bus, and an area represented by the lower 15 bits of the 19 bits of the address bus 14$b$ and defined by $E0000_H$ to $EFFFF_H$ is assigned to this bus. A bus representing its address space by 19 bits of the address bus 14b is referred to as an expanded bus A, and a bus representing its address space by the lower 15 bits of the address bus 14b is referred to as an expanded bus B. Reference numeral 11a denotes an expanded bus B enable signal output from the address decoder 11. The signal 11a consists of the BBHE and BBLE signals.

The selector 12 selects a signal output to the expanded slot 13 in accordance with the type of expanded bus or the bus access enable signal 14a. Reference numeral 12b denotes a bus type selection line for signalling to the selector 12 whether the bus type of device inserted in the expanded slot 13 is the expanded bus A or B. Reference numeral 12a denotes an access enable signal line connected to the expanded slot 13. The access enable signal consists of the EBHE and EBLE signals. An expanding device is connected to the expanded slot 13.

The expanded bus system shown in FIG. 3 comprises a 16-bit data bus. The upper 8 bits of the data bus are enabled to be accessed in response to the BHE signal and the lower 8 bits of the data bus are enabled to be accessed in response to the BLE signal. The MRC and MWC signals are used as command signals.

The expanding device connected to the expanded slot 13 outputs data to the upper 8-bit portion of the data bus when it receives an address signal assigned to its own address area through the address bus 14b, the MRC signal, and the EBHE signal of the access enable signal line 12a. When the EBLE signal is received, the expanding device outputs data to the lower 8-bit portion of the data bus. When the MWC signal and the EBHE signal of the access enable signal line 12a is received, the expanding device writes the upper 8-bit data of the data bus into the addressed area. When the EBLE signal is received, the expanding device writes the lower 8-bit data of the data bus into the addressed area.

When an expanded bus A type expanding device is connected to the expanded slot 13, the bus type selection line 12b is set on the expanded bus A side. In this case, the BHE and BLE signals of the bus access enable signal 14a are selected as the EBHE and EBLE signals of the access enable signal line 12a, respectively. The entire address area from $00000_H$ to $FFFFF_H$ can be used.

When an expanded bus B type expanding device is connected to the expanded slot 13, the bus type selection line 12b is used on the expanded bus B side. In this case, the BBHE and BBLE signals of the expanded bus B enable signal 11a are selected as the EBHE and EBLE signals of the access enable signal 12a. In this case, the EBHE signal is active when the BHE signal is active and the address bus 14b represents an address area from $E0000_H$ to $EFFFF_H$. Similarly, the EBLE signal is active when the BLE signal is active and the address bus 14b represents an address area from $E0000_H$ to $EFFFF_H$. Therefore, the address area for the expanded bus B type expanding device is limited to an area from $E0000_H$ to $EFFFF_H$.

FIGS. 4(a) to 4(g) are timing charts for explaining the operation when the bus type selection line 12b is set on the expanded bus B side.

FIG. 4(a) shows the waveform of a signal on the address bus 14b, FIG. 4(b) shows the waveform of the bus access enable signal 14a (BHE), FIG. 4(c) shows the waveform of the bus access enable signal 14a (BLE), FIG. 4(d) shows the waveform of the EBHE signal on the access enable signal line 2a, FIG. 4(e) shows the waveform of the EBLE signal on the access enable signal line 12a, FIG. 4(f) shows the waveform of the MRC signal on the command bus, and FIG. 4(g) shows the waveform of the MWC signal on the command bus.

Figure 5:
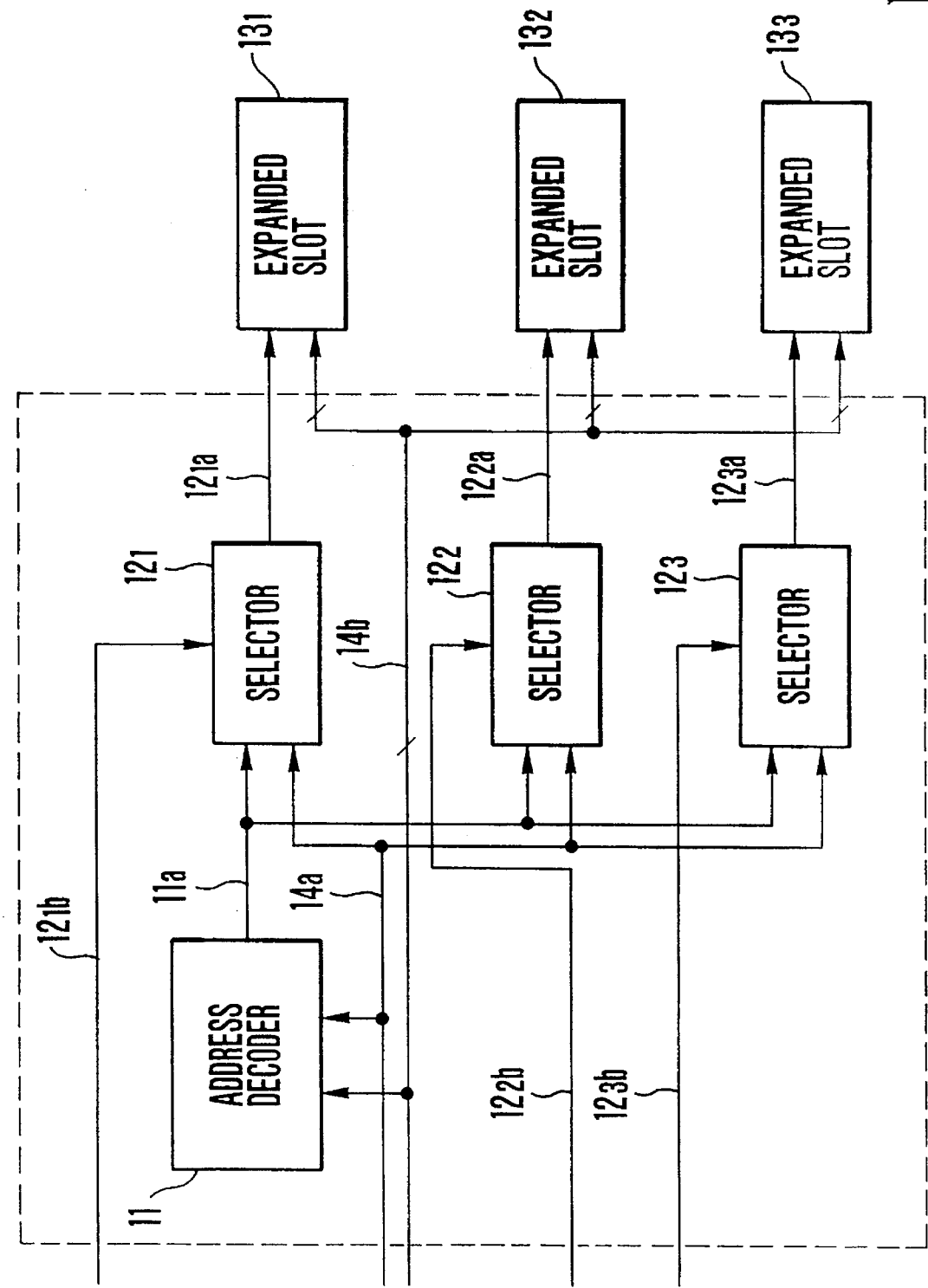
FIG. 5 is a block diagram of an application arrangement of the embodiment of FIG. 3.

FIG. 5 shows an application wherein a plurality of expanded slots are used. In this case, a plurality of selectors must be used.

The same reference numerals as in FIG. 3 denote the same parts in FIG. 5. Reference numerals $12_1$, $12_2$, and $12_3$ denote selectors for selecting an output from the address decoder 11 or the bus access enable signal 14a, and supplying the selected signal to expanded slots $13_1$, $13_2$, and $13_3$. Reference numerals $12_{1a}$, $12_{2a}$, and $12_{3a}$ denote access enable signal lines; and $12_{1b}$, $12_{2b}$, and $12_{3b}$, bus type selection lines.

According to the present invention, expanding devices having different address bit widths can be commonly used without adversely influencing the operating speed of the system and without increasing the number of signal lines of the expanded bus.

What is claimed is:

1. An expanded address bus system for coupling to a plurality of slave devices, each of which is inserted into one of a plurality of expanded slots, said expanded address bus system comprising:

an address bus having a bus access enable signal transmitted thereon and being compatible with an expanded bus type A or an expanded bus type B, said expanded bus type A having a predetermined address bus width equal in address bus width to said address bus, and said expended bus type B having an address bus width that is narrower than said address bus, said expanded address bus system further comprising:

an address decoder circuit receiving a set of address signals that address a whole address space of said expanded address bus system, said address decoder circuit decoding said set of address signals and producing decoded signals representing a portion of said whole address space during a slave access period, said whole address space including a portion having addresses assigned to respective slave devices, each of whose address bus is compatible with said expanded bus type B; and a plurality of selector circuits, corresponding in a one to one relation with said plurality of expanded slots, for selecting and for outputting either a selected one of said decoded signals of said address decoder circuit or the bus access enable signal onto the address bus of said slave devices that are inserted in said expanded slots, respectively.

2. An expanded address bus system according to claim 1, wherein said expanded bus type A allows a current address to be updated to an address for a next access while said current address is being asserted, and wherein said expanded bus type B allows an address to be maintained asserted during an access.

3. An expanded address bus system for coupling to a plurality of slave devices, each of which is inserted into one of a plurality of expanded slots, said expanded address bus system comprising:

an address bus having a bus access enable signal transmitted thereon and being compatible with an expanded bus type A or an expanded bus type B, said expanded bus type A having a predetermined address bus width equal in address bus width to said address bus, and said expended bus type B having an address bus width that is narrower than said address bus, said expanded address bus system further comprising:

address decoder means receiving a set of address signals that address a whole address space of said expanded address bus system for decoding said set of address signals and producing decoded signals representing a portion of said whole address space during a slave access period, said whole address space including a portion having addresses assigned to respective slave devices, each of whose address bus is compatible with said expanded bus type B; and a plurality of selector means, corresponding in a one to one relation with said plurality of expanded slots, for selecting and for outputting either a selected one of said decoded signals of said address decoder circuit or the bus access enable signal onto the address bus of said slave devices that are inserted in said expanded slots, respectively.

4. The expanded address bus system as recited in claim 3, wherein each of said selector means comprises:

first means for receiving said decoded signals;

second means for receiving said bus access enable signal; and third means for receiving a bus type selection signal, wherein said selector means selects one of said decoded signals and said bus access enable signal responsive to said bus type selection signal.

5. An expanded address bus system according to claim 3, wherein said expanded bus type A allows a current address to be updated to an address for a next access while said current address is being asserted, and wherein said expanded bus type B allows an address to be maintained asserted during an access.

* * * * *